US008954443B1

(12) United States Patent
Love et al.

(10) Patent No.: US 8,954,443 B1
(45) Date of Patent: Feb. 10, 2015

(54) MULTI-PROTOCOL DATA OBJECT SCANNING BY A STORAGE VIRTUALIZATION SYSTEM

(75) Inventors: Philip Love, Alhambra, CA (US); Dylan Simon, New York, NY (US); Srinivas Aji, Bangalore (IN); Ronald Brown, Dunfermline (GB); John Duncan Bankier, Glasgow (GB)

(73) Assignee: EMC Corporation, Hopkinton, MA (US)

( * ) Notice: Subject to any disclaimer, the term of this patent is extended or adjusted under 35 U.S.C. 154(b) by 499 days.

(21) Appl. No.: 11/965,095

(22) Filed: Dec. 27, 2007

(51) Int. Cl.
*G06F 7/00* (2006.01)
*G06F 17/30* (2006.01)

(52) U.S. Cl.
CPC .... *G06F 17/30203* (2013.01); *G06F 17/30171* (2013.01)
USPC .......................................................... 707/741

(58) Field of Classification Search
USPC .................................. 707/741, 782
See application file for complete search history.

(56) References Cited

U.S. PATENT DOCUMENTS

| 5,966,545 | A  | * | 10/1999 | Hanif et al. | 710/11 |
| 6,356,863 | B1 | * | 3/2002 | Sayle | 703/27 |
| 6,570,593 | B1 | * | 5/2003 | Bowers et al. | 715/775 |
| 8,112,472 | B2 | * | 2/2012 | Betts et al. | 709/203 |
| 2001/0051955 | A1 | * | 12/2001 | Wong | 707/201 |

FOREIGN PATENT DOCUMENTS

WO    WO 2004061605 A2 *  7/2004

* cited by examiner

*Primary Examiner* — James Trujillo
*Assistant Examiner* — Jeffrey Chang
(74) *Attorney, Agent, or Firm* — Dergosits & Noah LLP; Todd A. Noah

(57) ABSTRACT

The present invention is a method for performing a multi-protocol scan of a NAS system by a storage virtualization system to create a multi-protocol file index. Current NAS systems may utilize two protocols, CIFS and NFS. Storage virtualization systems migrate, redirect or synchronize data between a primary and a secondary NAS. Present storage virtualization systems are designed to work with NFS or CIFS systems, but not both. The present invention enables a storage virtualization system to simultaneously or near-simultaneously operate using NFS and CIFS protocols. The present invention also provides for a multi-protocol scan of a NAS device to ensure that all data files and data file attributes are recognized and preserved during storage virtualization.

16 Claims, 2 Drawing Sheets

MULTI-PROTOCOL DATA OBJECT SCANNING BY A STORAGE VIRTUALIZATION SYSTEM

TECHNICAL FIELD

The present invention relates generally to storage virtualization systems, and specifically, to a system and method for enabling a single storage virtualization system to work with multiple network file system protocols.

BACKGROUND OF THE INVENTION

Storage virtualization has emerged as an efficient and effective way to manage data objects stored on multiple network attached storage ("NAS") systems. A storage virtualization system may be a combination of hardware and software that acts as an intermediary between a client computer that generates and interacts with data objects or files, and the associated NAS system that stores the data objects. If a second NAS system is connected, then the storage virtualization system can migrate, copy or synchronize data objects between the first and second NAS systems without affecting the client's access to those data objects. The storage virtualization system operates transparently without the user's knowledge or intervention to seamlessly redirect the user's data objects from a first NAS system (the "source server," "source" or "src") to a second NAS system (the "destination server," "destination" or "dst").

One will appreciate that a NAS system will be able to understand a certain set of rules, procedure calls and computer instructions, also known as the network file system protocol. There are many different types of network file system protocols. In a basic configuration, the client computer and its associated NAS devices will all understand the same network file system protocol. As a result, in a single-protocol NAS system, all commands, file names and instructions will be recognized by each component of the NAS system, and each component will be compatible with the other. Single-protocol NAS systems may be common in smaller organizations, but it is more common for organizations to incorporate client computers and NAS systems of different network file system protocols. Such protocols may include the Network File System ("NFS") protocol and the Common Internet File System ("CIFS") protocol. It is also common for an organization to incorporate NAS systems that recognize both NFS and CIFS ("NFS+CIFS"), which may be called "mixed-protocol NAS systems." One skilled in the art will appreciate that NFS and CIFS protocols apply different rules and specifications that may not be cross-compatible. For example, data objects stored using the NFS protocol may be organized and named differently that those saved using the CIFS protocol. Similarly, mixed protocol NAS systems will typically keep NFS data objects and CIFS data objects separate, or may only store data objects of a single protocol, because of the incompatibilities between each protocol. As such, keeping track of data objects between or across different protocols is difficult, if not impossible.

Effective storage virtualization operations require that the storage virtualization system seamlessly communicate with the client computer and its associated NAS systems. The storage virtualization system will need to communicate with the associated NAS system in order to discover what data objects are stored in it. For those organizations having NAS systems using different or mixed protocols, this task becomes more difficult, the storage virtualization system will need to work with multiple protocols. Presently, some storage virtualization systems can issue both CIFS and NFS commands and instructions and thus work with both CIFS and NFS systems. These storage virtualization systems will typically only manage data from one NFS component to another NFS component, or alternatively, one CIFS component to another CIFS component. In other words, when the storage virtualization system works between NFS components, it issues NFS commands, and when the storage virtualization system works between CIFS components, it issues CIFS commands. Even when managing certain mixed-protocol NAS systems, the storage virtualization system will use the NFS protocol to manage the data objects stored using NFS, and the CIFS protocol to manage the data objects stored using CIFS. The storage virtualization system must be able to recognize what component it is managing in order to apply the correct protocol. This can slow and even limit storage virtualization operations since the storage virtualization system must be configured to use the correct protocol. Further, there is no cross-compatible storage virtualization system that will permit CIFS to NFS transfers or vice-versa. This is because no storage virtualization system can adequately reconcile the differences between the NFS and CIFS protocols.

The limitations of present storage virtualization systems force organizations to adhere to a single protocol. However, as organizations grow and merge, it becomes almost impossible to mandate allegiance to a single protocol. It is more common for organizations to maintain a NAS environment where clients and NAS systems run different or mixed network file system protocols, each with its own vendor-specific idiosyncrasies and specifications. Problems arise in mixed-protocol environments because data objects stored on a CIFS system cannot easily be synchronized or migrated to a NFS system. Similarly, data objects stored on a NFS system are not easily transferred or mirrored with a CIFS system. Additionally, data objects stored on a mixed NFS+CIFS system are not easily accessed or discoverable if the storage virtualization system does not know which protocol to use. Even though the data objects themselves may be moved, the differences in the protocols will cause important file attributes or metadata to go unrecognized or ignored, resulting in a loss of access to data objects after migration. As a result, even so-called multi-protocol storage virtualization systems may not keep an accurate record of the data objects stored in its associated NAS systems.

What is therefore needed is a way to provide mixed-protocol functionality to present and future storage virtualization systems, thereby improving multi-protocol storage virtualization systems. What is needed is a way for present and future storage virtualization systems to seamlessly work with NFS, CIFS or other types of network file system protocols in order to promote cross-protocol compatibility. What is needed is a way to identify the data objects stored on a NAS system regardless of protocol, without losing the data objects' associated metadata, file attributes or other associated file information.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

The present invention is a system and method for performing and storing a multi-protocol scan or scans of data objects stored on a NAS device. Providing a storage virtualization system with the ability to scan in multiple protocols will enable the virtualization system to recognize a data object regardless of the protocol used to store it on the associated NAS system. As described herein, an embodiment of the present invention is disclosed with reference to the NFS and CIFS protocols. One skilled in the relevant art will appreciate that the present invention will work with other network file system protocols and mixed network file system protocols without departing from the scope of this disclosure or the spirit of the present invention.

It should also be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The Storage Virtualization System

Figure 1:
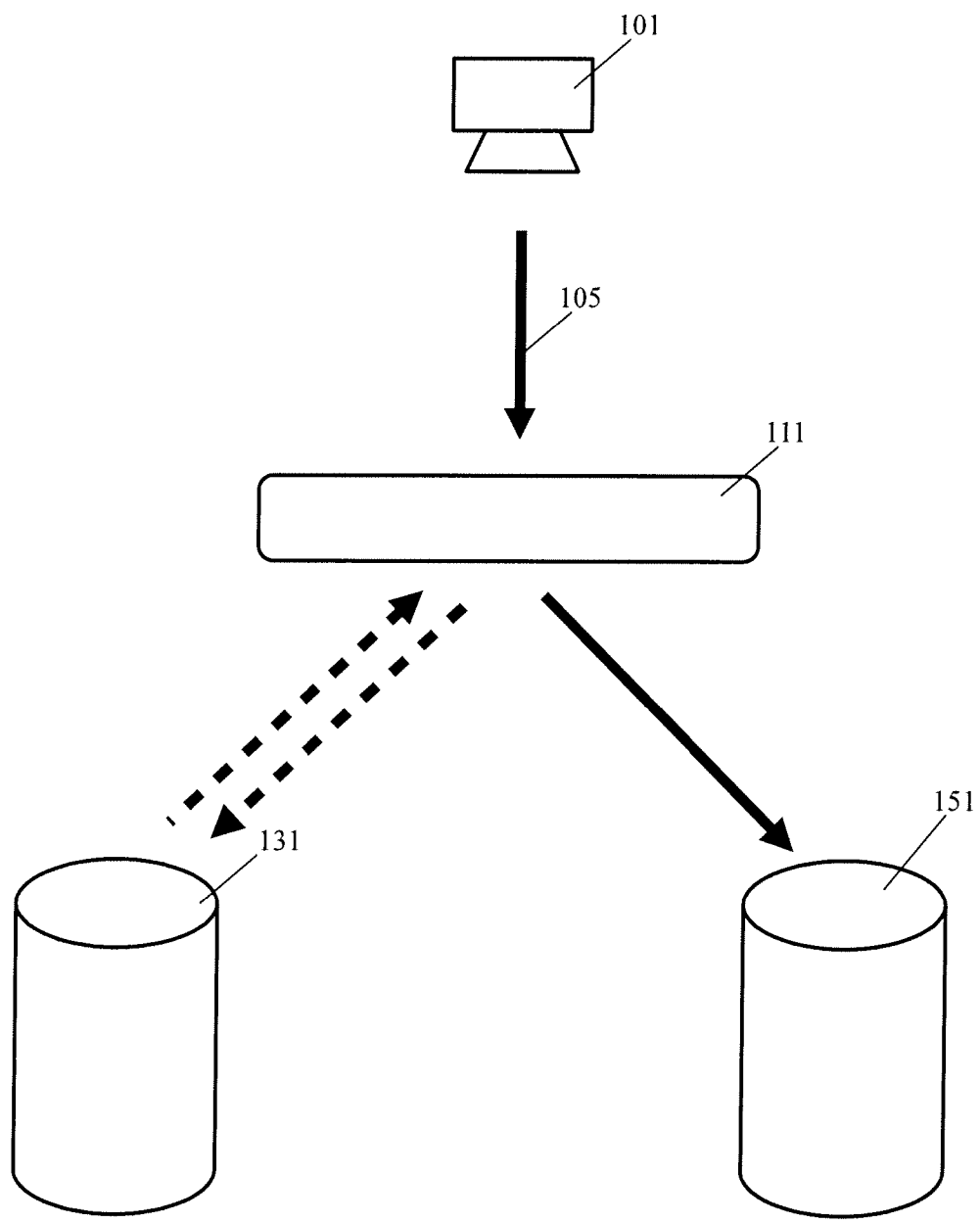
FIG. 1 is an exemplary block diagram depicting the elements of a storage virtualization system, according to one embodiment of the present invention.

FIG. 1 illustrates one exemplary setup for a storage virtualization system. A client computer 101 accesses a source NAS system 131 connected to a network 105. The storage virtualization system 111 is an intermediary that may cause data from the source NAS system 131 to be re-directed, migrated or copied to a destination NAS system 151. One will appreciate that FIG. 1 is merely an example of how a storage virtualization system 111 might interact with a source NAS system 131 and a destination NAS system 151, and that other configurations are possible.

In FIG. 1, source NAS system 131 may either utilize the NFS, the CIFS or a mixed NFS+CIFS protocol. Once enabled with the present invention, it will not matter to the storage virtualization system 111 which protocol is used, since storage virtualization system 111 will be able to scan the data objects stored in source NAS 131 regardless of the protocol used.

The Multi-Protocol Scan

Using the method of the present invention, a storage virtualization system will be able to issue multiple scans of an associated NAS system. For example, in an embodiment where two scans are used, a first scan may be a NFS query, and the second scan may be a CIFS query. Alternatively, the first scan may be a CIFS query and the second scan may be a NFS query. The scans may be simultaneously performed as well as sequentially performed, but one will appreciate that a single multi-protocol scan may be comprised of separate scans in the different protocols. The computer instructions for the multi-protocol scan and the results of the scan will be discussed further below.

Figure 2:
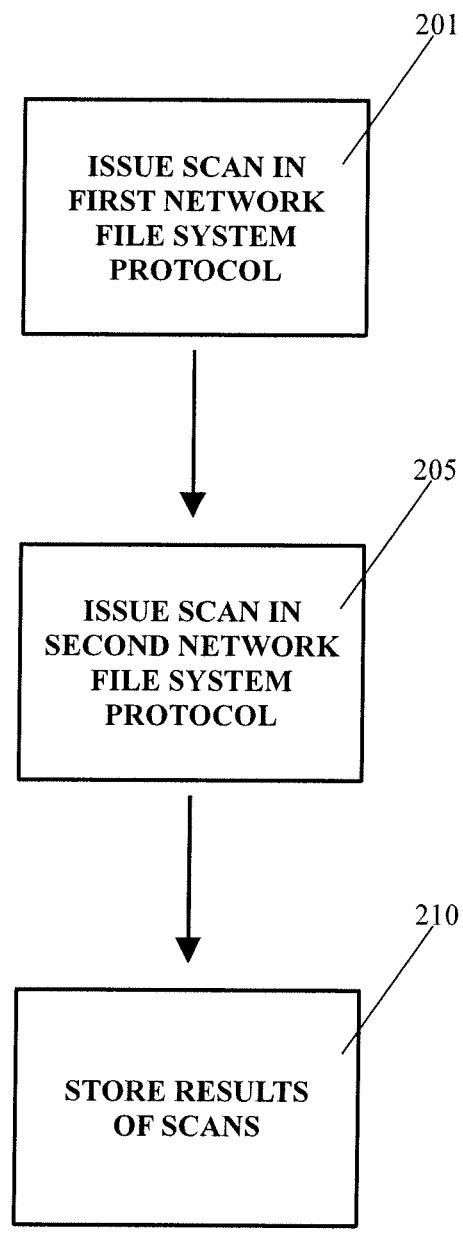
FIG. 2 is an exemplary flow diagram illustrating the steps of an embodiment of the present invention.

FIG. 2 illustrates a possible series of steps for performing the multi-protocol scan by the storage virtualization system 111. As noted above, a storage virtualization system 111 may perform these steps upon association with or connection to a source NAS 131. In another embodiment, these steps may be performed after the source NAS 131 has been associated or connected to the storage virtualization system 111, or the steps may be repeated as necessary to ensure scan results are up to date. In yet another embodiment, the steps may be user-initiated.

As shown in step 201 of FIG. 2, the storage virtualization system 111 may issue a computer instruction or command to scan the contents of the source NAS system 131. One will appreciate that the command may be issued by a daemon or other semi-automated software application within the storage virtualization system 111. The command may also be issued by a user, or as part of a routine automated system task. If the storage virtualization system 111 is issuing a NFS command, then the command may be "READDIR" or "READDIRPLUS" or the equivalent. If the storage virtualization system 111 is issuing a CIFS command, then the command may be "FindFirst2" or "FindNext2" or the equivalent. One will appreciate that there are a number of equivalent commands that may be used to scan the NAS system 131, so long as the command is intended to elicit a listing of data objects or information about the data objects stored in NAS system 131.

After issuing a first command to scan NAS system 131 using a first protocol in step 201, the storage virtualization system 111 may issue a second command to scan NAS system 131 using a second protocol in step 205. For example, if the storage virtualization system 111 issued a first scan command in NFS, then the second scan command may be in CIFS. Similarly, if the storage virtualization system 111 issued the first scan command in CIFS, then the second scan command may be in NFS. One will appreciate that other protocols may be used besides NFS and CIFS, and that more than two scans may be performed. One will also appreciated that a NFS and a CIFS scan of NAS system 131 may occur simultaneously.

One will appreciate that the results of the multi-protocol scan or scans will be returned to the storage virtualization system 131 and stored for later use (step 210 of FIG. 2. The results may be stored temporarily or permanently. The results may be in the form of an index, data structure, or may resemble the information returned upon issuance of a "ls-1" command on a UNIX system, or a "dir" command on a Windows® system. In an embodiment, results from a scan of NAS system 131 using a first protocol are received and stored, then results from a scan of NAS system 131 using a second protocol are received and stored. One may also envision that if NAS system 131 is being scanned using the first and second protocol at the same time, then scan results may be received simultaneously or near simultaneously, and then stored. One will appreciate that the sequence of when scan results are received and stored may vary. One will also appreciate that the format of the received scan results may vary. The present invention provides software instructions for the storage virtualization system to issue the scans and store the received results.

Once a storage virtualization system has been enabled with the multi-protocol scan method of the present invention, one will appreciate that the storage virtualization will be able to discover and monitor data objects on an associated NAS system regardless of the protocol used by the associated NAS system. As a result, the storage virtualization system may be connected to or associated with a NAS system that uses any type of protocol, and will then be able to recover the data objects stored on that NAS system. While previous storage virtualization systems would require some sort of manual or automatic configuration to properly decipher the type of protocol to apply, this task is obviated with the multi-protocol scanning capabilities of the present invention.

One will appreciate that in the above examples and in the Figures, the multi-protocol scanning steps are performed upon a source NAS system, such as NAS system 131. One will appreciate that the multi-protocol scanning aspect of the present invention may be performed upon any NAS system associated with storage virtualization system 111, including destination NAS system 151.

Locking the System

In some cases, the multi-protocol scanning process may require a significant amount of time, especially when the scanned NAS system contains a large number of data objects. During the scan process, there is a chance that a user may attempt access to a data object, thereby changing it in some way. This may cause scan results to become outdated before the scan is complete. An aspect of the present invention permits the addition of a step that would "lock" or prevent changes made to data objects before the multi-protocol scan is complete. This step may be performed by the storage virtualization system as an additional program instruction, or may be performed by a daemon hosted by the storage virtualization system. In one embodiment, this step forms part of a software-controlled mechanism termed "request_locking," or the equivalent that may be part of existing storage virtualization system software or added to existing storage virtualization system software.

In some instances, locking users out of the NAS system may not be desirable. In this case, there could be a mechanism for monitoring data object activity during a scan, such that any changes made to data objects during a scan will automatically be updated. This update can be real-time, near real-time or may be reflected after the scan is complete.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. For example, the present invention is described herein for a storage virtualization system managing data objects between two NAS systems. One will appreciate that the present invention will apply to a storage virtualization system responsible for data objects on more than two NAS systems, since the present invention is merely directed toward performing multi-protocol scanning of a NAS system and storing the results of the scan or scans in the storage virtualization system.

What is claimed is:

1. A method for scanning a Network Attached Storage ("NAS") comprising:
   providing a storage virtualization system connected to a NAS system that stores a plurality of data objects associated with different network file system protocols;
   issuing by the storage virtualization system, a first scan command;
   scanning the NAS system using a first network file system protocol to create a first index of data objects stored in the NAS system in response to the first scan command, the first network file system protocol is used to identify a first data object of the plurality of data objects stored in the NAS system;
   issuing by the storage virtualization system, a second scan command;
   scanning the NAS system using a second network file system protocol to create a second index of the data objects stored in the NAS system in response to the second scan command, the second file system network protocol is used to identify a second data object of the plurality of data objects stored in the NAS system due to an incompatibility between the first network file system protocol and some of the plurality of data objects stored in the NAS system,
   wherein the first data object is not identified by the second network file system protocol and the second data object is not identified by the first network file system protocol, wherein a NAS device in the NAS system is scanned using the first file system protocol and is scanned using the second file system protocol,
   wherein at the time of the scans using the first and second network file system protocols, the data objects stored on the NAS are the same; and
   storing the first index and the second index together in the storage virtualization system.

2. The method of claim 1, wherein scanning the NAS system using the first network file system protocol and scanning the NAS system using the second network file system protocol is performed simultaneously.

3. The method of claim 1, wherein the first network file system protocol is Network File System (NFS) and the second network file system protocol is Common Internet File System protocol (CIFS).

4. The method of claim 1, wherein the first network file system protocol is CIFS and the second network file system protocol is NFS.

5. A method for scanning a NAS system comprising:
   providing a storage virtualization system connected to a NAS system that stores a plurality of data objects associated with different network file system protocols;
   issuing by the storage virtualization system, a scan command;
   scanning the NAS system using a first network file system protocol and a second network file system protocol to create an index of the data objects stored in the NAS system in response to the scan command, the first network file system protocol is used to identify a first data object of the plurality of data objects stored in the NAS system, the second file system network protocol is used to identify a second data object of the plurality of data objects stored in the NAS system due to an incompatibility between the first network file system protocol and some of the plurality of data objects stored in the NAS system,
   wherein the first data object is not identified by the second network file system protocol and the second data object is not identified by the first network file system protocol, wherein a NAS device in the NAS system is scanned using the first file system protocol and is scanned using the second file system protocol,
   wherein at the time of the scans using the first and second network file system protocols, the data objects stored on the NAS are the same; and
   storing the index in the storage virtualization system.

6. The method of claim 5, wherein scanning the NAS system using the first network file system protocol and scanning the NAS system using the second network file system protocol is performed simultaneously.

7. The method of claim 5, wherein the first network file system protocol is Network File System (NFS) and the second network file system protocol is Common Internet File System protocol (CIFS).

8. The method of claim 5, wherein the first network file system protocol is CIFS and the second network file system protocol is NFS.

9. A computer program product, comprising a non-transitory computer usable medium having a computer readable program code embodied therein, the computer readable program code adapted to be executed to implement a method for scanning a NAS, the method comprising:

providing a storage virtualization system connected to a NAS system that stores a plurality of data objects associated with different network file system protocols;

issuing by the storage virtualization system, a first scan command;

scanning the NAS system using a first network file system protocol to create a first index of the data objects stored in the NAS system in response to the first scan command, the first network file system protocol is used to identify a first data object of the plurality of data objects stored in the NAS system;

issuing by the storage virtualization system, a second scan command;

scanning the NAS system using a second network file system protocol to create a second index of the data objects stored in the NAS system in response to the second scan command, the second file system network protocol is used to identify a second data object of the plurality of data objects stored in the NAS system due to an incompatibility between the first network file system protocol and some of the plurality of data objects stored in the NAS system, wherein the first data object is not identified by the second network file system protocol and the second data object is not identified by the first network file system protocol, wherein a NAS device in the NAS system is scanned using the first file system protocol and is scanned using the second file system protocol, wherein at the time of the scans using the first and second network file system protocols, the data objects stored on the NAS are the same; and storing the first index and the second index together in the storage virtualization system.

10. The computer program product of claim 9, wherein scanning the NAS system using the first network file system protocol and scanning the NAS system using the second network file system protocol is performed simultaneously.

11. The computer program product of claim 9, wherein the first network file system protocol is Network File System (NFS) and the second network file system protocol is Common Internet File System protocol (CIFS).

12. The computer program product of claim 9, wherein the first network file system protocol is CIFS and the second network file system protocol is NFS.

13. A computer program product, comprising a non-transitory computer usable medium having a computer readable program code embodied therein, the computer readable program code adapted to be executed to implement a method for scanning a NAS, the method comprising:

providing a storage virtualization system connected to a NAS system that stores a plurality of data objects associated with different network file system protocols;

issuing by the storage virtualization system, a scan command;

scanning the NAS system using a first network file system protocol and a second network file system protocol to create an index of the data objects stored in the NAS system in response to the scan command, the first network file system protocol is used to identify a first data object of the plurality of data objects stored in the NAS system, the second file system network protocol is used to identify a second data object of the plurality of data objects stored in the NAS system due to an incompatibility between the first network file system protocol and some of the plurality of data objects stored in the NAS system, wherein the first data object is not identified by the second network file system protocol and the second data object is not identified by the first network file system protocol, wherein a NAS device in the NAS system is scanned using the first file system protocol and is scanned using the second file system protocol, wherein at the time of the scans using the first and second network file system protocols, the data objects stored on the NAS are the same; and storing the index in the storage virtualization system.

14. The computer program product of claim 13, wherein scanning the NAS system using the first network file system protocol and scanning the NAS system using the second network file system protocol is performed simultaneously.

15. The computer program product of claim 13, wherein the first network file system protocol is Network File System (NFS) and the second network file system protocol is Common Internet File System protocol (CIFS).

16. The computer program product of claim 13, wherein the first network file system protocol is CIFS and the second network file system protocol is NFS.

* * * * *